Oct. 30, 1951  C. A. CHERRY  2,573,542
COMPACT UNIVERSAL VISE FOR MACHINE TOOLS
Filed Sept. 13, 1945  5 Sheets-Sheet 1
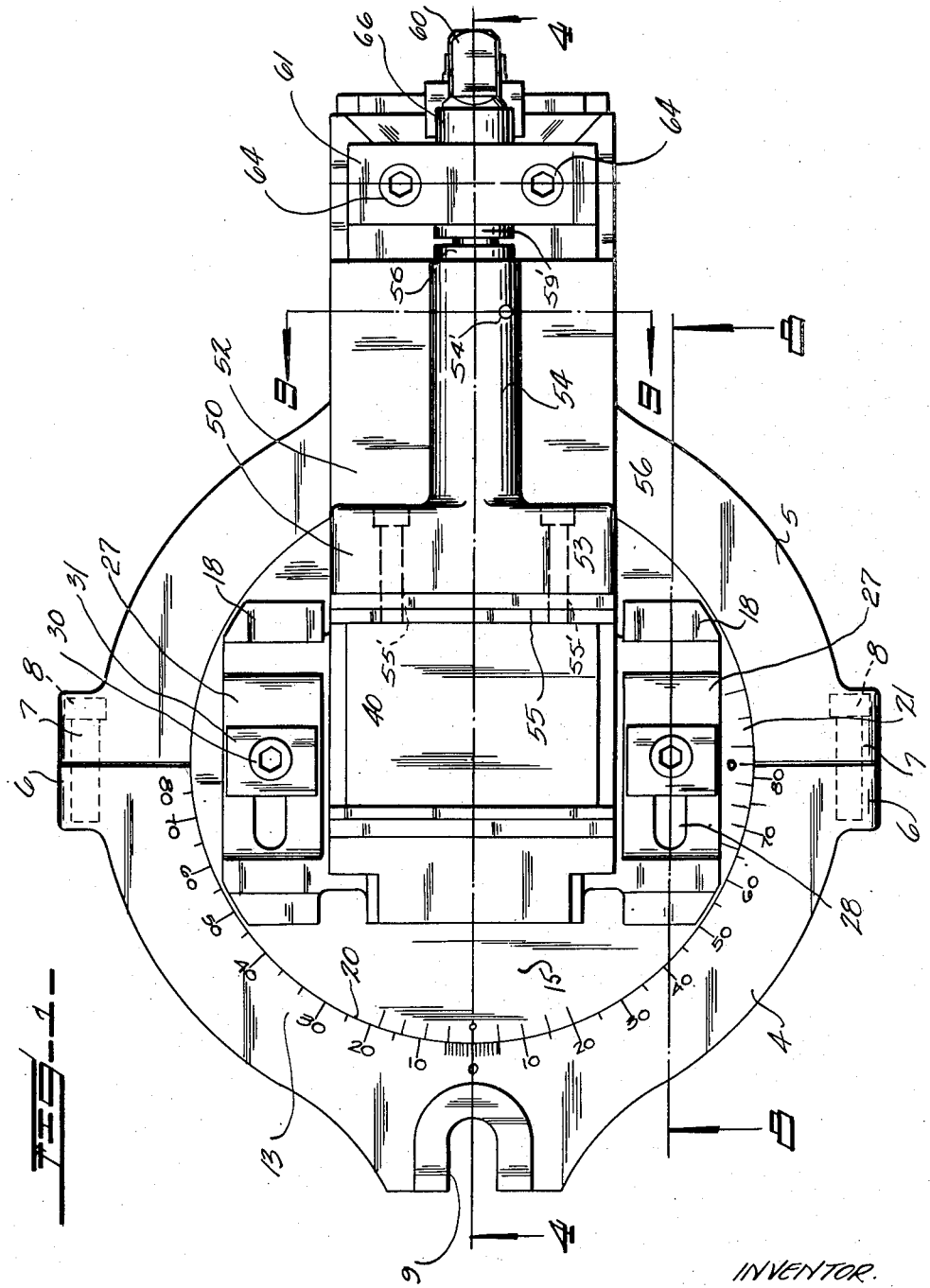
INVENTOR.
CHARLES A. CHERRY.
By Joseph Barley
ATTORNEY.

Oct. 30, 1951          C. A. CHERRY          2,573,542
          COMPACT UNIVERSAL VISE FOR MACHINE TOOLS
Filed Sept. 13, 1945                    5 Sheets-Sheet 2
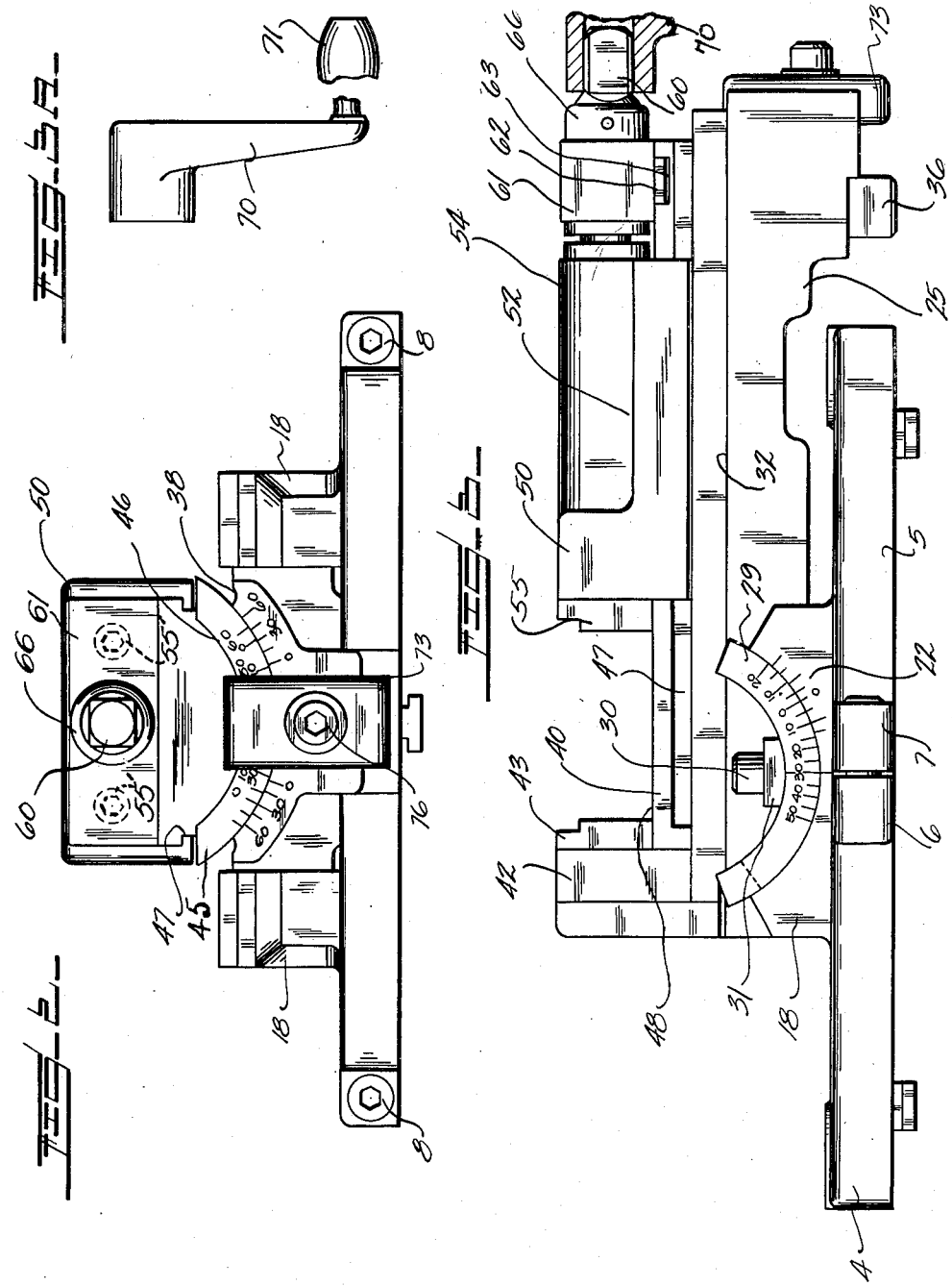
INVENTOR.
CHARLES A. CHERRY.
BY Joseph Farley
ATTORNEY.

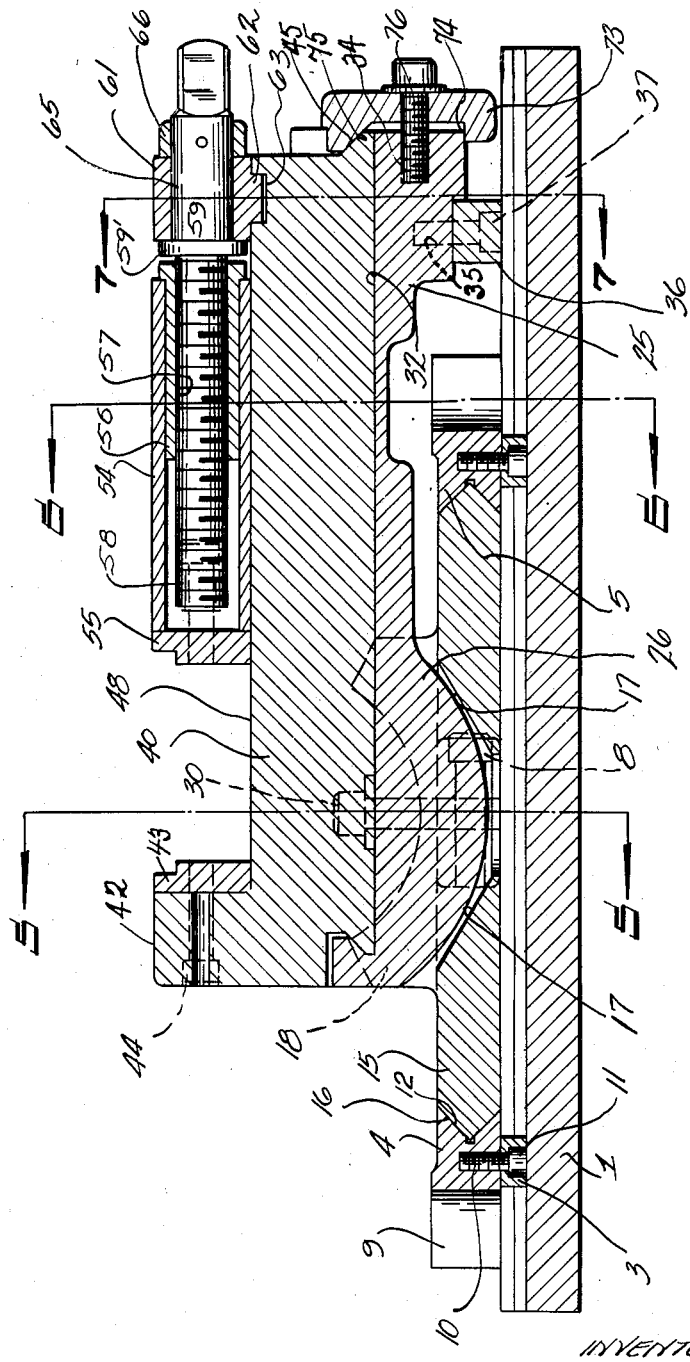

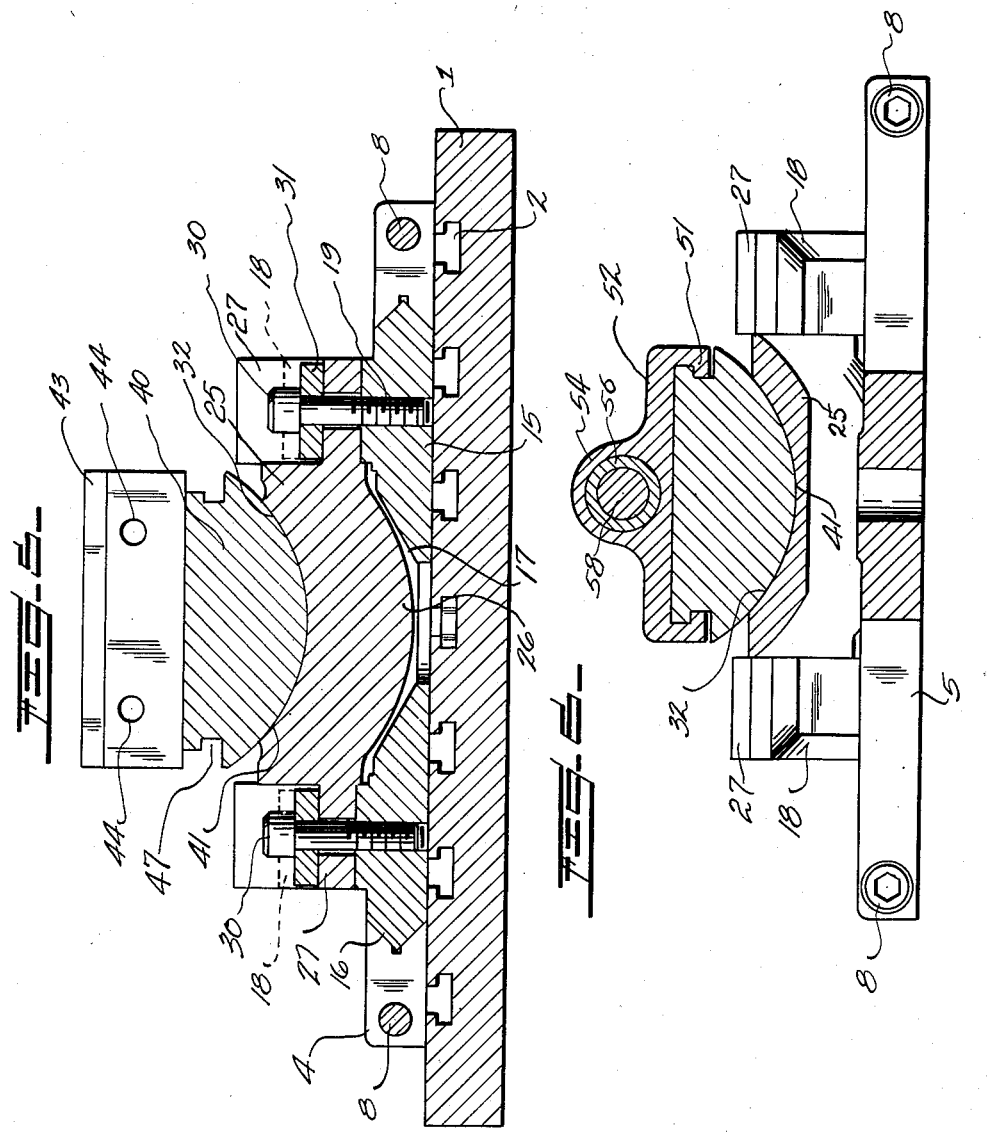

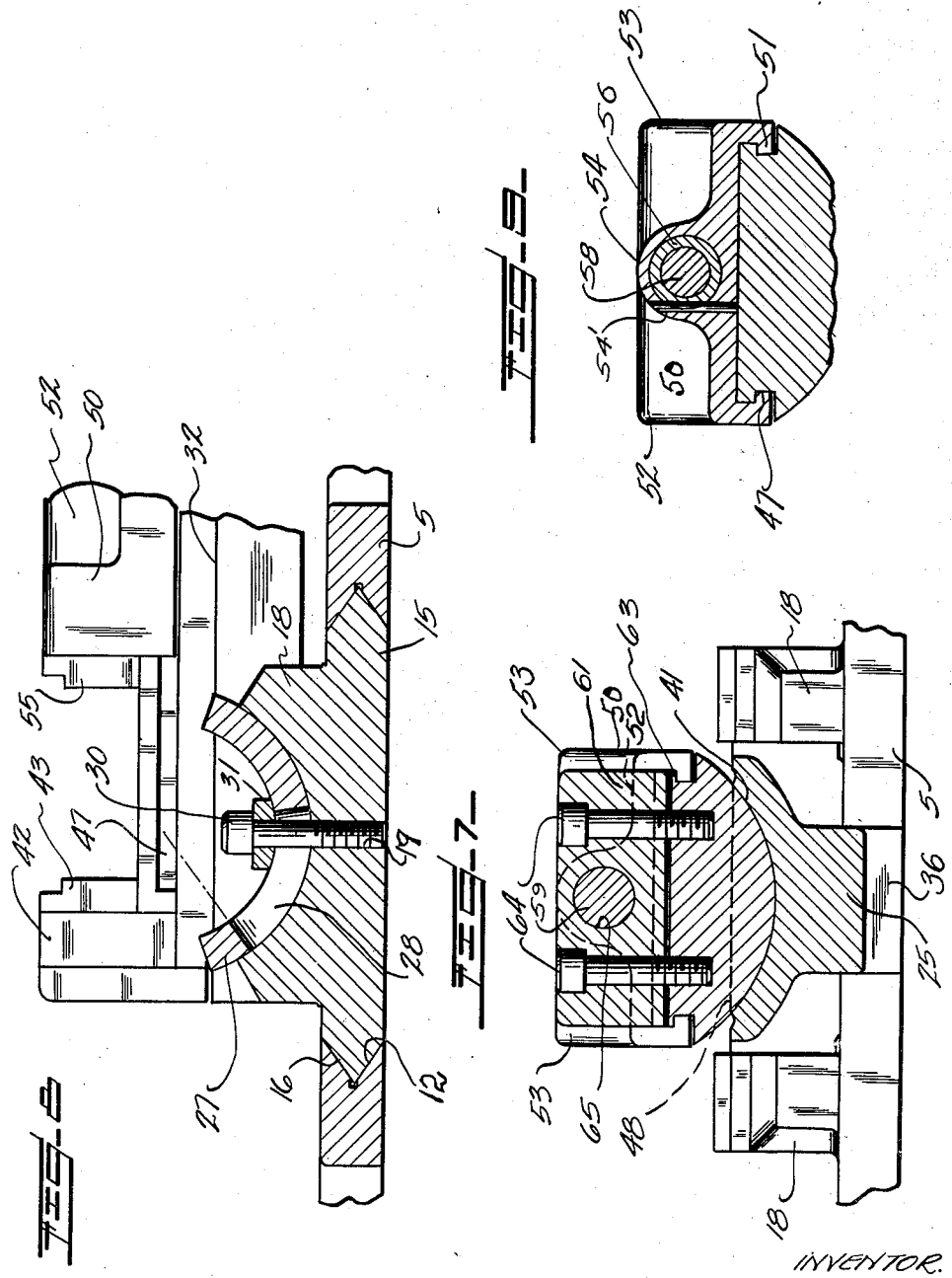

Patented Oct. 30, 1951

2,573,542

UNITED STATES PATENT OFFICE 2,573,542

COMPACT UNIVERSAL VISE FOR MACHINE TOOLS

Charles A. Cherry, Berkley, Mich., assignor to Beaver Tool & Engineering Corp., Royal Oak, Mich., a corporation of Michigan Application September 13, 1945, Serial No. 615,983

4 Claims. (Cl. 81—41)

1

The present invention pertains to a novel universal vise for holding work on a metal working or other machine. The vise is of the character that enables adjustment of the work piece in three planes, each of which is perpendicular to the other two, or about the $x$, $y$ and $z$-axes of the conventional system of coordinates.

A vise of this general character is usually mounted on the table of a machine so that it lies between the table and the tool. In many machines the distance between the table and the tip of the tool is limited and consequently the height of the vise from the table, or its silhouette, is correspondingly limited.

The object of this invention is to provide a vise having a small height or low silhouette and yet capable of holding workpieces in the larger sizes for which the particular machine is intended.

A universal vise comprises basically three independently movable parts adjustable respectively about the three named axes. One of the parts is journaled in the base structure, and two of the adjustable parts are provided in one manner or another with bearings for supporting other parts.

The stated object of the invention is accomplished generally by a unique construction in the bearings. The base or supporting structure is relatively thin, in the form of a split ring, and the first adjustable part carried thereby is of substantially the same thickness and mounted in the ring. Thus, the first adjustable part is mounted in the lowest possible position, that is, substantially in contact with the surface of the table.

The second adjustable part is rotatably mounted on the first part. In keeping with the object of the invention, the first adjustable part or disk is formed on its upper surface with a segmental bearing for the second part. The segmental bearing obviously has only a fraction the height of a full 360° bearing. Moreover, the first adjustable part has a depressed seat receiving a dropped portion of the second adjustable part so that the aforementioned low position of the bearing is made possible.

The second part supports the third adjustable part. Again, contributing to the low silhouette, the major portion of the second part, beyond its depressed portion, is formed as an elongated segmental bearing for receiving the third part. The latter segmental bearing is dropped as low as possible.

The mutually adjacent, relatively movable

2 parts are properly scaled or graduated to show the angular displacement of one to the other, which scales are conveniently formed on arcuate portions of mutually adjacent parts or at the bearings and trunnions thereof and suitable locking means are provided for securing the parts in the desired adjustable positions.

The above and other objects of the invention will appear more fully from the more detailed description and by reference to the accompanying drawings forming a part thereof and wherein:

Fig. 1 is a plan view of the device;
Fig. 2 is an end view;
Fig. 3 is a side elevation;
Fig. 3-A is a detail elevation of the adjusting crank;
Fig. 4 is a central longitudinal section on the line 4—4 of Fig. 1;
Figs. 5, 6 and 7 are sections on the lines 5—5, 6—6 and 7—7 of Fig. 4; and
Figs. 8 and 9 are sections on the lines 8—8 and 9—9 of Fig. 1.

Reference to these views will now be made by use of like characters which are employed to designate corresponding parts throughout.

The device is adapted to be detachably mounted upon the table 1 of a machine tool in any suitable or conventional manner, having the usual T-slots 2 in its surface in which locating blocks 3 preferably fastened to the bottom of the vise assembly are adapted to be received.

In order to provide for adjustment in a horizontal plane, the vise stands on a base ring comprised of two semi-circular segments 4 and 5 formed at their ends with ears 6 and 7 at which the segments are secured together by screws 8. Each segment is formed at its center with an outwardly extending fork 9 to receive suitable bolts for bolting the vise to the machine table in the usual manner. Behind each fork is a tapped hole 10 receiving a screw 11 which secures one of the above-mentioned locating blocks 3 to the underside of the base ring.

Along the inner circumference of each segment 4, 5 is formed a V-groove 12 for receiving the correspondingly shaped perimeter of a circular disk, as will presently be shown, obviously before the segments are fastened together. The segment 4 is provided immediately over its V-groove with an arcuate scale 13 suitably graduated in degrees for a purpose that will be described.

The previously mentioned disk assembled between the segments 4, 5 is designated by the numeral 15 and is formed with a V-edge 16 fitted rotatably in the grooves 12. In the center of the upper surface of the disk is formed a conical recess 17. At opposite sides of the socket are formed two upwardly projecting equal and coaxial segmental bearing blocks 18. A pair of tapped holes 19 are provided in the disk 15 and are located one on each side thereof centrally of each of said bearing blocks.

The face of the disk 15 is provided near its edge with a vernier scale 20 cooperating with the scale 13 and carries another similar scale 21 on its face spaced 90° from the scale 20. Still another angle scale 22 is formed on the vertical side face of one of the blocks 18 adjacent to one side thereof. It is evident that the disk 15 is rotatable within the segments 4, 5 on a vertical axis or the $y$-axis of the conventional system of coordinates.

The disk 15 supports an elongated cradle designated by the numeral 25 (see Fig. 4). The bottom of the cradle is formed at one end as a convex spherical segment 26 which projects downwardly into the recess 17 of the disk 15. At opposite sides of the spherical segment are laterally extending arcuate trunnions 27 fitted respectively in the segmental bearing blocks 18. Each trunnion has a circumferential slot 28 overlying the hole 19. The member 25 is adjustable on the disk 15 about a horizontal axis or the $x$-axis of the conventional system of coordinates. In this connection an angle scale 29 is formed on an end of one of the trunnions 27 in a position to cooperate with the scale 22 on one of the members 18. The selected adjustment of the cradle 25 is secured by screws 30 passed through the slots 28 and the aligned holes 19, with a convex-faced washer 31 interposed between the head of each screw and the concave face of the adjacent trunnion 27.

The elongated member 25 is formed along its length, in its upper surface, with a cylindrical seat 32 extending between the trunnions 27 adapted to receive another member rotatably adjustable about a horizontal axis perpendicular to both the $x$-axis and the $y$-axis or, in other words, adjustable about the $z$-axis of the conventional system of coordinates.

In the rear end of the member 25 a hole 34 is drilled and tapped in the axial direction beneath the seat 32. Forward of the hole 34 and at opposite sides thereof are formed two vertical drilled and tapped holes 35 from the bottom for the fastening of a rest bar 36 by screws 37. The bar 36 rests on the table 1 to maintain the cradle 25 in the horizontal or zero position. On the rear end of the cradle and along the seat 32 is formed an angle scale 38 having its center in the $z$-axis.

The seat 32 of the cradle 25 furnishes a support for the vise proper which consists of a slidable jaw carrier 50 and a non-sliding jaw carrier comprising an elongated member 40 having a convex cylindrical bottom 41 mounted in the seat 32. The forward end of the carrier 40 is formed with an upright jaw 42 having a facing block 43 secured on its inner surface by a pair of screws 44.

The rear arcuate end of the member 40 is bevelled off to form a conical shoulder 45, and on this shoulder is inscribed an angle scale 46 cooperating with the scale 38 to indicate adjustments in the $z$-axis. The member 40 is also formed on its outer surface, along each edge, with a longitudinal groove 47 for guiding the slidable jaw carrier mounted on the member 40, as will presently be described. The upper surface 48 of the member 40 is flat and smooth.

The slidable jaw carrier is a somewhat elongated block 50 mounted on the surface 48 and having considerably less length than said surface. At the bottom of the block 50 and along the longitudinal edges are formed inwardly directed tenons or guides 51 slidably received in the grooves 47, the member 50 being slipped on the member 40 from the rear end. The upper surface of the block 50 is relieved at 52 along both edges from the rear to a distance short of the forward end, thereby forming a pair of lateral wings 53 at the forward end and a longitudinal hump or boss 54. The wings 53 enable the attachment of a facing block 55 to the forward extremity of the carrier 50 by means of a pair of screws 55' threaded into the wings from the rear.

The boss 54 receives a bushing 56 which is formed internally and longitudinally with an Acme thread 57 into which is screwed an Acme screw 58; the shank 59 of the screw is formed with a collar 59', and the free end of the shank is formed as a non-circular head 60 for a purpose presently to be described, a pin 54' being driven into the boss 54 and through one side of the bushing 56 to hold the latter against longitudinal or rotational movement when the screw 58 is rotated.

A bearing block 61 surrounds the shank 59 of the screw 58 and has its bottom narrowed at 62 for reception in a transverse slot 63 cut in the top of the member 40 at the rear end thereof.

The block 61 is held down by a pair of screws 64 passed therethrough at opposite sides of the bearing surface 65 thereof and threaded into the top of the non-sliding carrier 40. The collar 59' engages the forward face of the block 61 while the rear face is engaged by a ring 66 fastened on the shank 59 of the Acme screw 58. It is now evident that on rotation of the Acme screw 58, the latter is held against longitudinal movement and will therefore feed the slidable carrier 50 on the non-sliding carrier 40.

In order to turn the Acme screw there is provided a crank 70 that fits on the squared head 60 of the screw. To the outer end of the crank is fastened a ball crank handle 71 by any suitable means. By actuation of the slidable jaw carrier 50 in the manner described, the work is clamped between or released from the jaw facings 43, 55.

In the use of the device, and assuming that work is clamped between the facings 43, 55, adjustment is obtained about the vertical or $y$-axis by turning the disk 15 after releasing the screws 8. The screws are tightened after the adjustment has been made. The displacement is measured on the scales 13, 20.

Adjustment on the horizontal $x$-axis is obtained by first loosening the screws 30 and swinging the body 25 in a vertical plane until the desired angular displacement is indicated on the scales 22, 29. The screws 30 are then tightened.

Adjustment about the horizontal $z$-axis is obtained by rocking the non-sliding jaw carrier 40 in its seat 32 in the member 25. The adjustment is shown on the scales 38, 46. This adjustment is secured by a clamp 73 at the rear ends of the members 25, 40. The clamp has a lower lip 74 engaging the bottom of the member 25 and is formed at its upper end with a convex conical lip 75 bearing on the graduated shoulder 45. A screw 76 passed through the clamp and into the axial hole 34 in the cradle 25 tightens the lips against the surfaces engaged thereby and, due to the slopes of the surfaces 45 and 75, locks the members 25, 40 together.

As already indicated the device of this invention is designed particularly for use in installations where the distance between the table and the cutting tool is limited. The invention conforms with this limitation, while permitting ample displacement in all three dimensions, by providing a device having a low silhouette. The latter characteristic results from several unique features of the invention, separately and in combination. For example, the adjustment about the y-axis involves only a relatively flat or thin structure comprised of the segments 4, 5 and the disk 15 rotatable therein. Next, the adjustment in the x-axis is obtained by the segmental trunnions 27 seated in the segmental bearings 18. The segmental character of these parts and their symmetry with respect to vertical and horizontal planes passing through the common axis contribute materially to the low silhouette. A similar condition exists with respect to the rocking adjustment of the carrier 40 on the z-axis in the segmental seat 32 of the cradle 25. Each of the upwardly facing concave members 18 and 25 reduces the silhouette correspondingly. The cylindrical seat 32 in the member 25 permits the slidable jaw carrier 50 to be lowered considerably, and also furnishes a substantial surface area upon which the vise proper is supported, while the reception of the spherical segment 26 in the socket 17 similarly lowers the non-sliding jaw carrier 40.

While I have described a satisfactory constructional example of the present invention, it will be understood that many changes, variations and modifications of the specific constructional details may be resorted to without departing from the spirit of the appended claims.

I claim:

1. A universal vise comprising a base, a disk rotatable therein on an axis perpendicular to the general plane of said base, a segmental bearing carried by said disk and having an axis perpendicular to the first named axis, a depressed seat formed in said disk between the faces thereof, a body having a dropped seating portion extending into said seat, a dropped segmental bearing carried by said portion and following the concavity of said depressed seat, said dropped bearing having an axis perpendicular to both the first and second named axes, a jaw carrier rotatably mounted in the last named bearing, and a complementary jaw carrier slidably mounted on the first named carrier.

2. A universal vise comprising a base, a disk rotatable therein on an axis perpendicular to the general plane of said base, a segmental bearing carried by said disk and having the lowermost point of its bearing surface extending into close proximity to a surface of said disk, the axis of said bearing being perpendicular to the first named axis, a depressed seat formed in said disk between the faces thereof, a body having a portion rotatably mounted in said bearing and having a dropped portion extending into said seat, a dropped segmental bearing carried by said portion and following the concavity of said depressed seat, said dropped bearing having an axis perpendicular to both the first and second named axes, a jaw carrier rotatably mounted in the last named bearing, and a complementary jaw carrier slidably mounted on the first named carrier.

3. A universal vise comprising a base, a disk rotatable therein on an axis perpendicular to the general plane of said base, a pair of spaced segmental bearings carried by said disk and aligned on an axis perpendicular to the first named axis, a depressed seat formed in said disk between the faces thereof and between said bearings, a body having a dropped portion extending into said seat, trunnions carried by said body at opposite sides of said dropped portion and seated in said bearings, a second segmental bearing carried by said portion and having an axis perpendicular to both the first and second named axes, a jaw carrier rotatably mounted in the last named bearing, and a complementary jaw carrier slidably mounted on the first named carrier.

4. A universal vise comprising a base, a disk rotatable therein on an axis perpendicular to the general plane of said base, a pair of spaced segmental bearings carried by said disk and aligned on an axis perpendicular to the first named axis, a depressed seat formed in said disk between the faces thereof and between said bearings, a body having a dropped portion extending into said seat, trunnions carried by said body at opposite sides of said dropped portion and seated in said bearings, a dropped segmental bearing carried by said portion and following the concavity of said depressed seat, said dropped bearing having an axis perpendicular to both the first and second named axes, a jaw carrier rotatably mounted in the last named bearing, and a complementary jaw carrier slidably mounted on the first named carrier.

CHARLES A. CHERRY.

REFERENCES CITED

The following references are of record in the file of this patent:

UNITED STATES PATENTS

| Number | Name | Date |
| --- | --- | --- |
| 650,644 | Koeppen | May 28, 1900 |
| 1,168,318 | Long | Jan. 18, 1916 |
| 1,292,235 | Beckett | Jan. 21, 1919 |
| 1,299,488 | Long | Apr. 8, 1919 |
| 1,394,912 | Korkosz | Oct. 25, 1921 |
| 1,423,774 | Moore | July 25, 1922 |
| 1,690,611 | Zimmerman | Nov. 6, 1928 |
| 2,207,881 | Smith | July 16, 1940 |
| 2,353,891 | Gruntorad | July 18, 1944 |
| 2,371,435 | Galorneau | Mar. 13, 1945 |

FOREIGN PATENTS

| Number | Country | Date |
| --- | --- | --- |
| 869,987 | France | Nov. 27, 1941 |

OTHER REFERENCES

Popular Science, June, 1943, page 116; Advertisement, Universal Vise & Tool Co., Parma, Mich.